Aug. 28, 1928.
J. LÖFSTRÖM ET AL
1,682,622
MOTOR SLEIGH
Filed Aug. 20, 1924     2 Sheets-Sheet 1
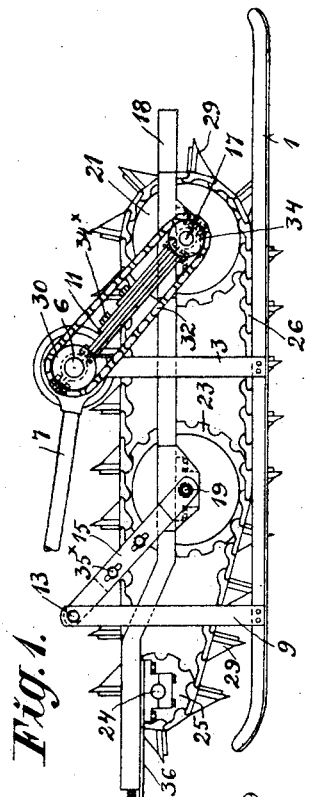
Fig.1.
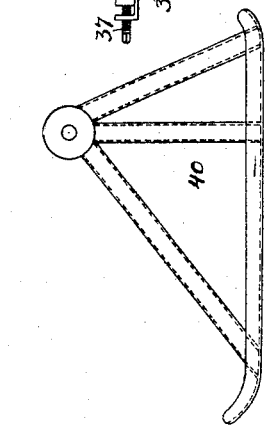
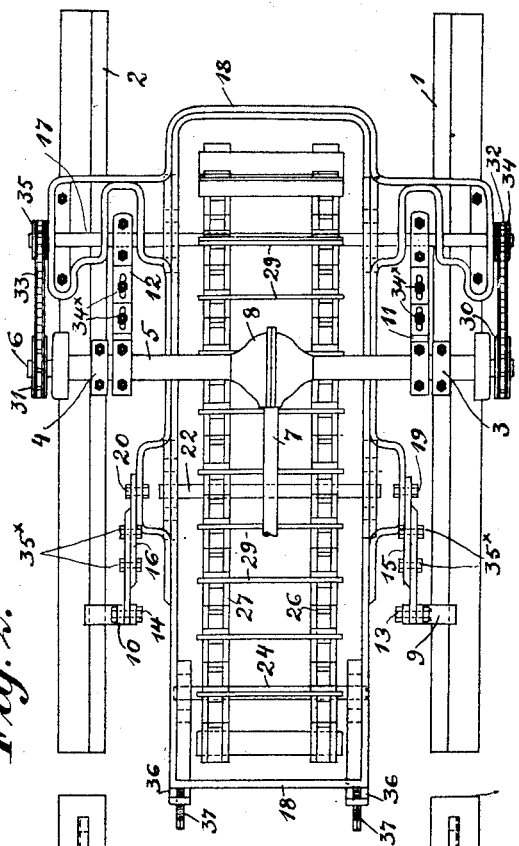
Fig.2.
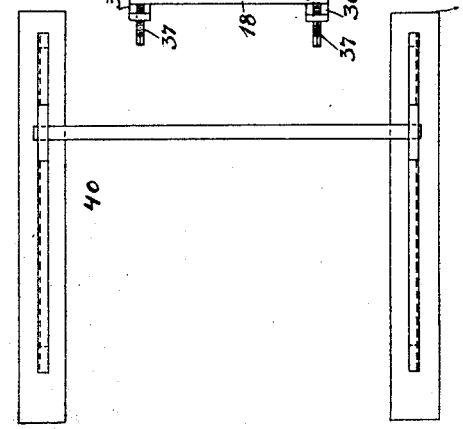
Inventors
J. Löfström
O. Löfström
By Marks & Clerk
Attys.

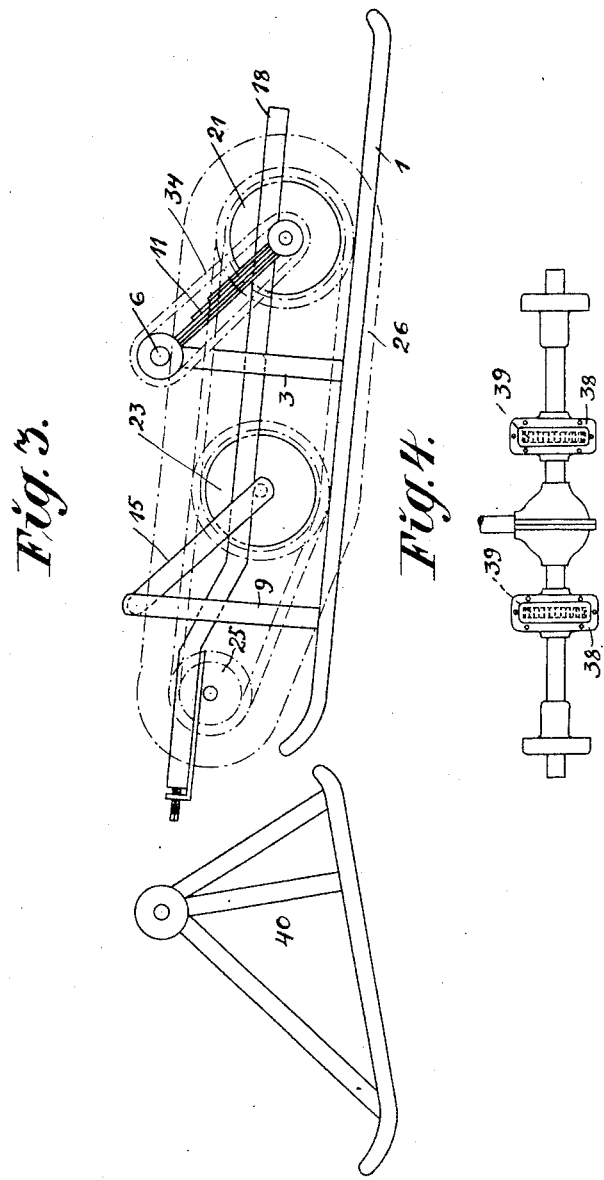

Patented Aug. 28, 1928.

1,682,622

UNITED STATES PATENT OFFICE.

JOHANNES LÖFSTRÖM AND OLOF LÖFSTRÖM, OF OSTERSUND, SWEDEN, ASSIGNORS OF ONE-HALF TO ANDERS ERIKSSON, OF BODA, LIT, SWEDEN.

MOTOR SLEIGH.

Application filed August 20, 1924, Serial No. 733,221, and in Sweden May 19, 1924.

This invention relates to a motor sleigh or driving sled for motor sleighs, in which an endless, driving chain or belt running on wheels or drums, is so mounted, that the member of the chain engaging the snow or ice, always is held parallel with the runners but the chain, nevertheless, is able to ascend and descend freely in the sleigh or sled. The said sled may constitute the driving member of a motor sleigh, constructed specially for this purpose, or it may be applied to an already existing automobile. In each case the sled is adapted to oscillate on a shaft (the rear shaft of the automobile), so that it may adjust itself to the unevenesses of the surface of the snow. Owing to the stated manner, in which the driving chain is mounted, it follows the adjustment of the sled to the unevennesses of the surface of the snow. If, however during the travel of the motor sleigh the sled passes a part of the road, where the surface of the snow between the runners is higher or lower than the level of the runners, the driving chain is able to ascend and descend respectively, for which reason it will always remain in engagement with the snow. Owing to this fact the sleigh may be driven in a wholly reliable manner without any injurious straining of the driving chain, while travelling on an uneven snow-covering.

In the accompanying drawings Figs. 1 and 2 are a side view and a plan view respectively of a driving sled arranged in accordance with this invention; the said figures also show the forward sled. Fig. 3 illustrates diagrammatically the manner, in which the driving sled operates when travelling over a rise in the surface of the snow. Fig. 4 shows in a side view an arrangement of the driving shaft of an automobile for transmitting motion to the driving chain of the sled.

The driving sled is shown in the drawings applied to the rear shaft of an automobile 1 and 2 are the runners of the sled. On the said runners uprights 3 and 4 are provided, adapted to be swingably mounted on the protecting cover 5 of the driving shaft 6 of the automobile, as shown. Shaft 6 is driven by the engine (not shown), of the automobile in the ordinary manner by means of a Cardan shaft 7 and a gearing provided in the casing 8. The driving means may, however, be of any other type. On the runners two other uprights 9 and 10 are provided having the same position mutually and the same height as the uprights 3 and 4. Preferably yieldable links 11 and 12 are swingably mounted on the cover 5, and links 15 and 16 are swingable on pins 13 and 14 provided at the top ends of the uprights 9 and 10. Links 11, 12, 15 and 16 have the same length. Links 11 and 12 carry a shaft 17 journaled in a frame 18, while links 15 and 16 are pivoted to the frame 18 by pins 19 and 20. Shaft 17 carries two sprocket-wheels 21 and on a second shaft 22 journaled in the frame 18 co-axially to the pins 19 and 20, sprocket-wheels 23 are fixed, acting as guide wheels. In the drawings the said sprocket-wheels 23 have the same size and the same position relatively to the frame 18 as the sprocket-wheels 21. A third shaft 24 is journaled in the frame 18 and carries two sprocket-wheels 25 also acting as guide-wheels. The said sprocket-wheels 25 are smaller than the sprocket-wheels 21 and 23 and are located on a higher level than the same, so that the fore part of driving chains 26 and 27 respectively running on the sets of sprocket-wheels 21, 23 and 25 have a slanting position downwards toward the ground, as shown in Fig. 1. Cross slats or bars 29 are fixed to the chains 26 and 27 and adapted to engage the ice or surface of the snow. Driving power is transmitted from the shaft 6, driven by the engine, to the shaft 17 by means of sprocket-wheels 30 and 31, fixed on the places of the removed driving wheels of the automobile, chains 32 and 33 and sprocket-wheels 34 and 35 respectively fixed on the shaft 17. For the tightening of the chains 32 and 33 the springy links 11 and 12 consist of plate springs fixed to each other by slot- and screw-bolt-connections 34×. In order that it may be possible to impart to the links 15 and 16 the same length as to the links 11 and 12, each of the links 15 and 16 consists of two parts fixed to one another by a slot- and screw-bolt-connection 35×. The tightening of the driving chains 26 and 27 is effected by means of the sprocket wheels 25, journaled in slides 36, which are movable in guides, provided on the frame 18, and are shifted by means of screws 37 in screw-threaded engagement with the slides 36 and bearing against the frame 18.

The links 11, 12, 15 and 16 constitute, as perceived from Figs. 1 to 3 inclusive, a parallel connection for the frame 18, which always keeps the said frame in positions, parallel to the runners 1 and 2. Owing to this fact the driving part of the chain 26, 27, 29 always is parallel to the runners 1 and 2. If the said runners meet a rise in the snow-covering, the sled is swung upwards on the shaft 6, Fig. 3. In consequence of the said parallel connection the driving part of the chain is still held in a position parallel to the runners, for which reason the teeth constituted by the bars 29 will remain in a reliable engagement with the snow also at the said slanting position of the sled. It is the same at any position of the sled. The driving chain may, however, freely ascend and descend in the sled. Consequently, if the motor sleigh is propelled on a road, in which there is a groove between the tracks, the driving chain will be able to descend and remain in engagement with the snow-covering. If the snow-covering between the tracks is higher than the tracks, the driving chain is able to run on the higher part of the snow-covering. Consequently, the driving chain remains under all circumstances in a reliable engagement with the snow-covering. Owing to the fact that the fore part of the driving member of the chain has a slanting position downwards and backwards, the teeth 29 will successively penetrate into the snow-covering. In this manner their engagement with the snow is considerably facilitated. Further, the driving member of the chain is subjected to stretching by the actuation of the driving sprocket-wheels 21, which also contributes to a uniform propelling of the sleigh without jerks. The shock of the driving chain against the snow-covering, while the sled passes an abrupt ledge, is softened by the yielding links 11.

The driving sled is easily applied to already existing automobiles, owing to the fact that it is necessary only to remove the driving wheels and to fix the sprocket-wheels 30 and 31 on their places and, further, to fix the uprights 3 and 4 to the cover of the driving shaft and to mount the links 11 and 12 on the same. The forward sled 40 is mounted on the shaft of the fore wheels. Also the changing from motor-sleigh to automobile is easily effected. If the automobile, during the manufacturing of same, is specially adapted for the mounting of the driving sled, the cover of the driving shaft is provided with two casings 38, Fig. 4, for sprocket-wheels 39 fixed to the said shaft. The sprocket-wheels 34 and 35 of the shaft 17 are then mounted in corresponding positions on the shaft 17, so that the chain gearing will be located inside the frame 18. When the automobile is used as such, for instance during summer, the casings 38 are closed by covers.

The invention, which evidently, may be modified in many respects without exceeding the limits of same, may be adapted also to motor sleighs, which have no forward sled and instead of same are provided with a steering-device of other type.

We claim:

1. Driving aggregate for motor sleighs comprising in combination a sled, a frame, driving and guiding wheels rotatably journaled in the front and rear ends respectively of the frame, an endless traction element running on said wheels, front and rear supports provided on the sled, parallel links of equal length and pivotally connected at one end to the said frame and at the other end to the said supports at equal vertical distances from the runners, and means for pivotally connecting the sled with a horizontal shaft of an automobile, said links permitting the frame together with the traction element, when acted upon by unevennesses of the snow, to ascend and descend automatically and independently of the sled while maintaining the parallel position of the driving part of the traction element relatively to the runners of the sled.

2. Driving aggregate for motor sleighs comprising in combination a sled, a frame, driving and guiding wheels rotatably journaled in the front and rear ends respectively of the frame, an endless traction element running on said wheels, front and rear supports provided on the sled, parallel links of equal length and pivotally connected at one end to the said frame and at the other end to the said supports at equal vertical distances from the runners, the rear links being yieldable transversely, and means for pivotally connecting the sled with a horizontal shaft of an automobile said links permitting the frame together with the traction element, when acted upon by unevennesses of the snow, to ascend and descend automatically and independently of the sled while maintaining the parallel position of the driving part of the traction element relatively to the runners of the sled.

In witness whereof, we have hereunto signed our names.

JOHANNES LÖFSTRÖM.
OLOF LÖFSTRÖM.